(12) United States Patent
Kato et al.

(10) Patent No.: US 7,034,475 B2
(45) Date of Patent: Apr. 25, 2006

(54) CONTROL APPARATUS FOR CONTROLLING REGENERATIVE OPERATION OF VEHICLE MOTOR

(75) Inventors: Shinji Kato, Utsunomiya (JP); Koichi Yamamoto, Utsunomiya (JP); Koji Tamenori, Utsunomiya (JP); Akihiro Anekawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 234 days.

(21) Appl. No.: 10/717,327

(22) Filed: Nov. 18, 2003

(65) Prior Publication Data

US 2004/0227480 A1 Nov. 18, 2004

(30) Foreign Application Priority Data

Nov. 20, 2002 (JP) ............................. 2002-336688

(51) Int. Cl.
*H02P 1/00* (2006.01)
*H02P 3/00* (2006.01)
*H02P 5/00* (2006.01)

(52) U.S. Cl. ...................... 318/139; 318/434; 318/376; 320/116; 320/152; 320/132; 324/433

(58) Field of Classification Search ...................... None
See application file for complete search history.

(56) References Cited

U.S. PATENT DOCUMENTS 5,684,383 A * 11/1997 Tsuji et al. .................. 320/134
5,780,980 A * 7/1998 Naito .......................... 318/139
5,908,453 A * 6/1999 Tabata et al. .................. 701/22
5,931,245 A * 8/1999 Uetake et al. .............. 180/65.8
6,234,932 B1 * 5/2001 Kuroda et al. .................. 477/3
6,316,917 B1 * 11/2001 Ohta .......................... 320/166

(Continued)

FOREIGN PATENT DOCUMENTS

JP           04-299032          10/1992

*Primary Examiner*—David Martin
*Assistant Examiner*—Renata McCloud
(74) *Attorney, Agent, or Firm*—Lahive & Cockfield, LLP; Anthony A. Laurentano, Esq.

(57) ABSTRACT

A control apparatus for controlling a regenerative operation of a vehicle motor includes a vehicle motor as a drive source of a vehicle, an energy storage device, including plural cells, for storing regenerative energy generated by a regenerative operation of the vehicle motor, and a total voltage measuring device for measuring a total voltage that is a sum of inter-terminal voltages of the plural cells, a cell voltage judgment device for determining whether the inter-terminal voltage of any one of the plural cells exceeds a predetermined regeneration limitation voltage, a total voltage estimating device for determining, when it is determined by the cell voltage judgment device that the inter-terminal voltage of any one of the cells exceeds the predetermined regeneration limitation voltage, an estimated total voltage which is defined as a total voltage at a time when the inter-terminal voltage of the one of the cells reaches a regeneration prohibition voltage that is higher than the predetermined regenerative operation limiting voltage, and a control device for setting an amount of regeneration depending on a difference between the estimated total voltage determined by the total voltage estimating device and the total voltage measured by the total voltage measuring device.

3 Claims, 4 Drawing Sheets

U.S. PATENT DOCUMENTS

| | | | |
|---|---|---|---|
| 6,480,767 B1 * | 11/2002 | Yamaguchi et al. | 701/22 |
| 6,483,198 B1 * | 11/2002 | Schmitz et al. | 290/40 C |
| 6,501,250 B1 * | 12/2002 | Bito et al. | 320/152 |
| 6,573,675 B1 * | 6/2003 | Schmitz et al. | 318/434 |
| 6,573,688 B1 * | 6/2003 | Nakanishi | 320/135 |
| 6,608,482 B1 * | 8/2003 | Sakai et al. | 324/426 |
| 6,612,386 B1 * | 9/2003 | Tamai et al. | 180/65.4 |
| 6,646,421 B1 * | 11/2003 | Kimura et al. | 320/132 |
| 6,795,756 B1 * | 9/2004 | Zhang et al. | 701/22 |
| 6,847,127 B1 * | 1/2005 | Lee | 290/40 C |
| 6,897,635 B1 * | 5/2005 | Ozawa et al. | 320/127 |
| 2002/0113595 A1 * | 8/2002 | Sakai et al. | 324/433 |

* cited by examiner

CONTROL APPARATUS FOR CONTROLLING REGENERATIVE OPERATION OF VEHICLE MOTOR

BACKGROUND OF THE INVENTION

1. Field of the Invention

The present invention relates to a control apparatus for controlling a regenerative operation of a vehicle motor.

Priority is claimed on Japanese Patent Application No. 2002-336688, filed Nov. 20, 2002, the content of which is incorporated herein by reference.

2. Description of Related Art

Conventionally, a charging apparatus for a battery assembly (battery) which is formed by connecting plural cell units of secondary batteries or the like to each other in series is known, in which the charging apparatus includes cell voltage measuring circuits and bypass circuits each being connected to each of the cell units, the charging apparatus determines whether each of the unit cells is in a fully charged state depending on an inter-terminal voltage measured by each of the cell voltage measuring circuits, makes charging current for any of the cell units which are determined to be fully charged to flow to the bypass circuits so that the inter-terminal voltages of the cell units are equalized with each other, and in addition, sets charging current for each of the cell units depending on the measured inter-terminal voltage (see, for example, Japanese Unexamined Patent Application, First Publication No. H04-299032).

Moreover, a type of vehicle is known in which the above-mentioned type of battery is installed as a driving power source, a driving motor is operated by supplying electrical power thereto from the battery, regenerated energy generated through a regenerative operation of the driving motor during a deceleration operation or the like of the vehicle is stored in the battery, and electrical energy is transmitted between the battery and the driving motor.

In the charging apparatus for a battery as an example of conventional technical measures, when it is determined that one of the cells is in a fully charged state, charging current to the specific cell is reduced to zero or to a level of self-discharging current. Accordingly, in the case in which the above-mentioned type of charging apparatus is installed in a vehicle, when it is determined that one of the cells is in a fully charged state when regenerated energy generated through a regenerative operation of the driving motor during a deceleration operation or the like of the vehicle is charged into the battery, the amount of regeneration by the driving motor is reduced to a level of zero or substantially zero. As a result, a rapid change in the deceleration operation of the vehicle, which is not expected by the driver, may occur, and thereby the driver may feel unusual sensations in the vehicle behavior.

SUMMARY OF THE INVENTION

The present invention was conceived in view of the above circumstances, and an object thereof is to provide a control apparatus for controlling a regenerative operation of a vehicle motor which enables smooth running of a vehicle using the vehicle motor while protecting an energy storing device that sends and receives electrical energy to and from the vehicle motor.

In order to achieve the above object, the present invention provides a control apparatus for controlling a regenerative operation of a vehicle motor including: a vehicle motor as a drive source of a vehicle; an energy storage device, including plural cells that are connected to each other in series, for storing regenerative energy generated by a regenerative operation of the vehicle motor; a total voltage measuring device for measuring a total voltage that is a sum of inter-terminal voltages of the plural cells; a cell voltage judgment device for determining whether the inter-terminal voltage of any one of the plural cells exceeds a predetermined regeneration limitation voltage; a total voltage estimating device for determining, when it is determined by the cell voltage judgment device that the inter-terminal voltage of any one of the cells exceeds the predetermined regeneration limitation voltage, an estimated total voltage which is defined as a total voltage at a time when the inter-terminal voltage of the one of the cells reaches a regeneration prohibition voltage that is higher than the predetermined regenerative operation limiting voltage; and a control device for setting an amount of regeneration depending on a difference between the estimated total voltage determined by the total voltage estimating device and the total voltage measured by the total voltage measuring device.

According to the above control apparatus for controlling a regenerative operation of a vehicle motor, when it is determined that the inter-terminal voltage of any one of the cells exceeds the predetermined regeneration limitation voltage, the total voltage estimating device estimates the total voltage (an estimated total voltage) which is defined as the voltage at a time when the inter-terminal voltages of the cells whose inter-terminal voltages have exceeded the regeneration limitation voltage reach a regeneration prohibition voltage by, for example, adding a value, which is obtained by summing up the differences between the regeneration limitation voltage and the regeneration prohibition voltage over the plural cells, to the total voltage at the time measured by the total voltage measuring device. The control device sets an amount of regeneration by the vehicle motor depending on the difference between the estimated total voltage and the measured total voltage, such that, for example, the less the difference, the lower the amount of regeneration is set, and the greater the difference, the higher the amount of regeneration is set.

As a result, the amount of regeneration can be smoothly reduced when compared with the cases in which the amount of regeneration is reduced to a predetermined value including zero in a stepped manner for preventing overcharging of the cells when, for example, the inter-terminal voltage of any one of the cells reaches the regeneration prohibition voltage, or when, for example, the measured total voltage reaches a predetermined upper limit, and thus excessive and rapid changes in driving states can be prevented.

The above control apparatus for controlling regenerative operation of a vehicle motor may further include a regeneration prohibiting device for not allowing the vehicle motor to perform a regenerative operation when the inter-terminal voltage of any one of the cells reaches the regeneration prohibition voltage before the total voltage measured by the total voltage measuring device reaches the estimated total voltage determined by the total voltage estimating device.

According to the above control apparatus for controlling a regenerative operation of a vehicle motor, even when, for example, any one of the cell voltages reaches the regeneration prohibition voltage before the measured total voltage reaches the estimated total voltage, i.e., even when the estimated total voltage includes an error, overcharging of the cells can be reliably prevented by prohibiting or restraining the regenerative operation of the vehicle motor by the regeneration prohibiting device.

Moreover, in this case, even when, for example, the amount of regeneration is reduced to a predetermined value including zero in a stepped manner at a time at which the cell voltage reaches the regeneration prohibition voltage, the amount of regeneration is merely changed to a predetermined value from a value which is obtained by being appropriately reduced depending on the difference between the estimated total voltage and the measured total voltage; therefore, changes in the amount of regeneration can be reduced when compared with the case in which, for example, the amount of regeneration is reduced to a predetermined value in a stepped manner without executing such a reduction operation depending on the difference between the estimated total voltage and the measured total voltage, and thus excessive changes in driving states can be prevented.

DETAILED DESCRIPTION OF THE INVENTION

An embodiment of the control apparatus for controlling a regenerative operation of a vehicle motor according to the present invention will be explained below with reference to appended drawings.

Figure 1:
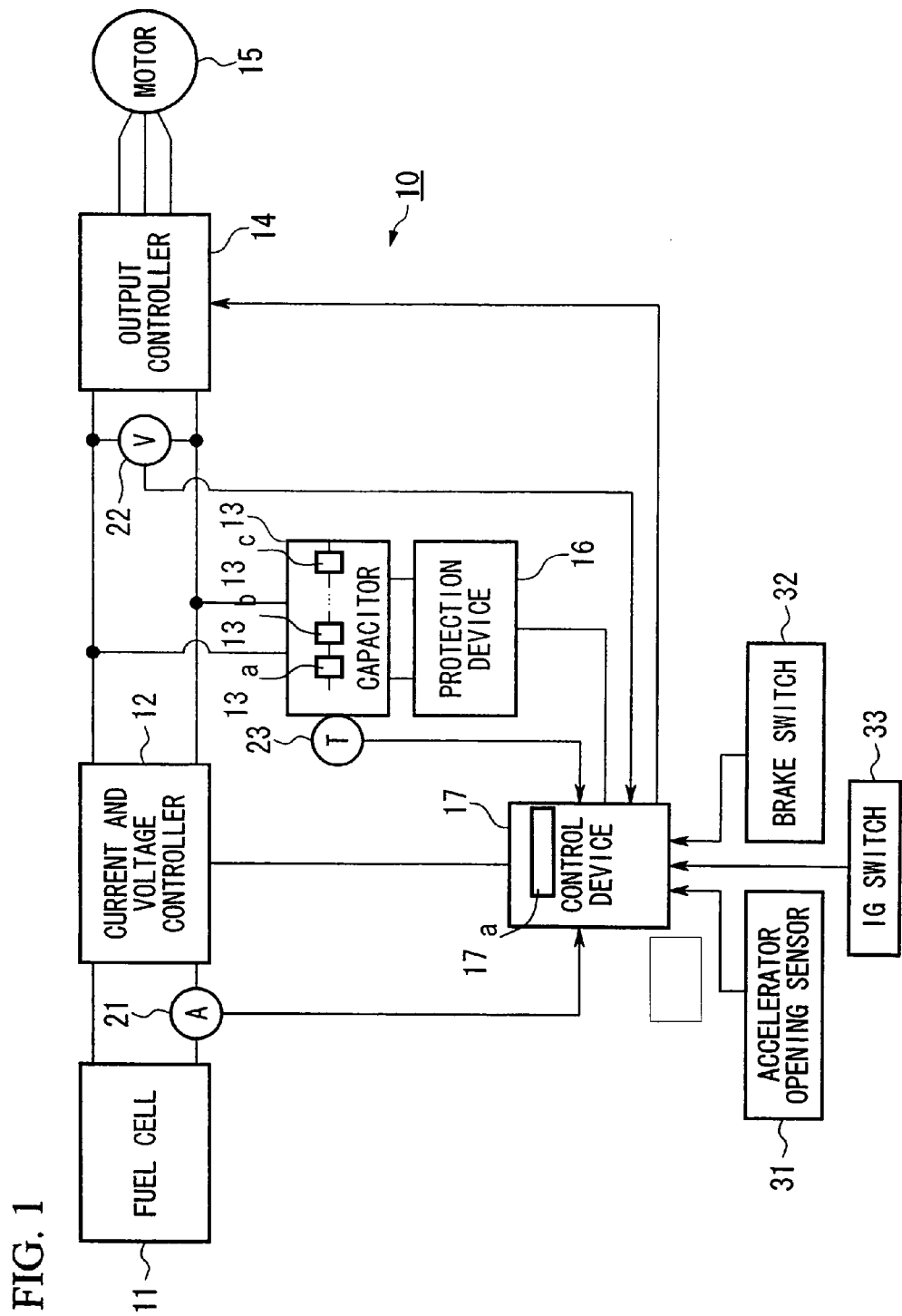
FIG. 1 is a schematic constitution diagram showing an embodiment of the control apparatus for controlling a regenerative operation of a vehicle motor according to the present invention.
Figure 2:
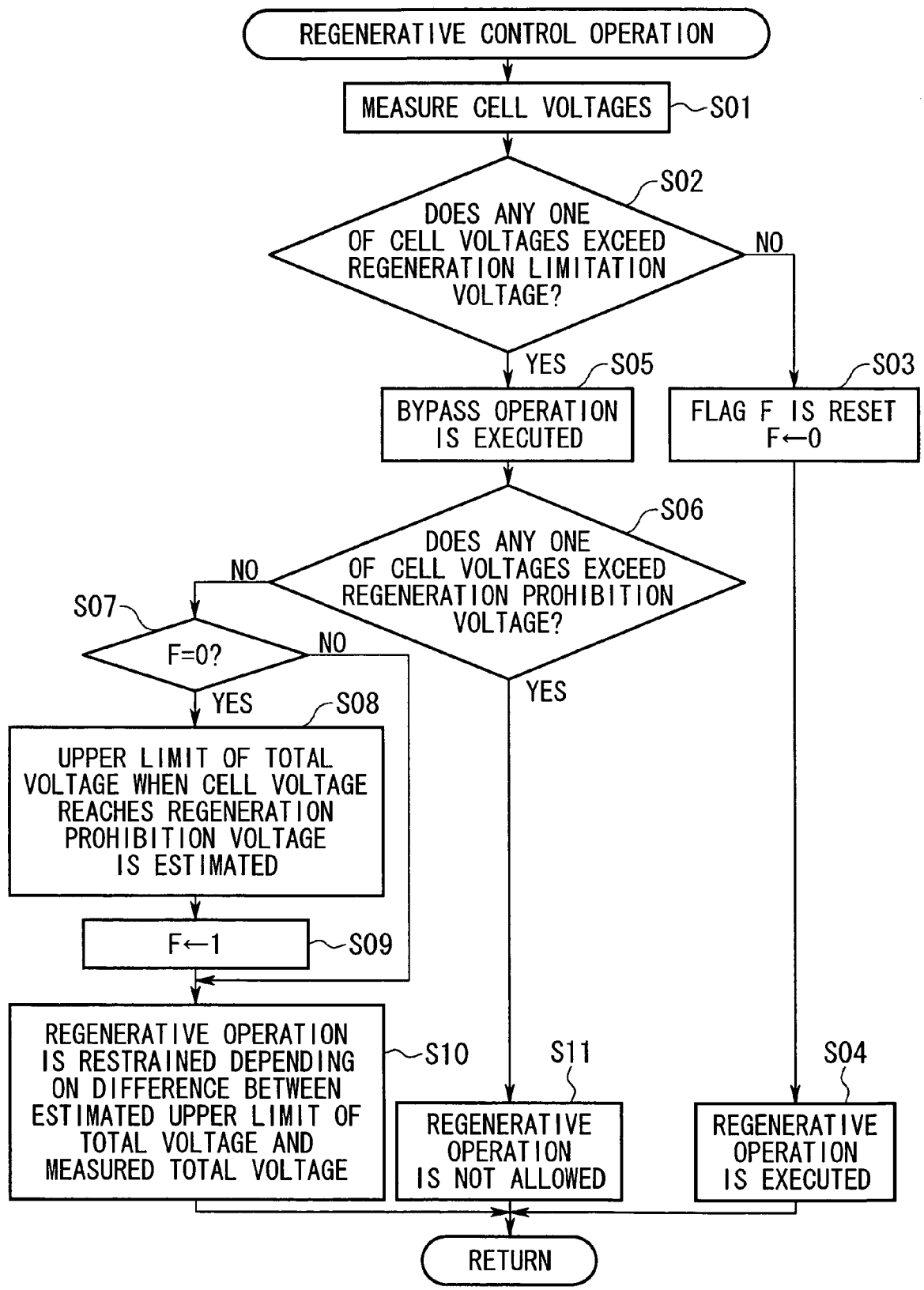
FIG. 2 is a flowchart showing operations of the control apparatus for controlling a regenerative operation of a vehicle motor shown in FIG. 1.

A regenerative operation control apparatus 10 for a vehicle motor according to the present embodiment is installed, for example, in a fuel cell powered vehicle, a hybrid vehicle, or the like, and as shown, for example, in FIG. 1, in the case in which a fuel cell powered vehicle includes a fuel cell 11, a current and voltage controller 12, a capacitor 13, an output controller 14, a driving motor 15, a protection device 16, and a control device 17, the regenerative operation control apparatus 10 includes, for example, the output controller 14, the protection device 16, the control device 17, a current sensor 21, a voltage sensor 22, and a capacitor temperature sensor 23.

The fuel cell 11 is formed by stacking a number of fuel cell units, each of which is formed by sandwiching an electrolyte electrode assembly by a pair of separators, the electrolyte electrode assembly being formed by sandwiching a solid polymer electrolyte membrane by a fuel electrode (an anode) including an anode catalyst and a gas diffusion layer and an oxygen electrode (a cathode) including a cathode catalyst and a gas diffusion layer.

When a fuel gas (a reaction gas) including hydrogen is supplied to the anode of the fuel cell 11 from a high pressure hydrogen tank, hydrogen is ionized through a catalytic reaction on the anode catalyst of the anode, ionized hydrogen moves to the cathode via the solid polymer electrolyte membrane that is appropriately humidified, and electrons generated during the movement are supplied to an external circuit and used as direct current electrical energy. For example, air, which is an oxidizing gas (a reaction gas) including oxygen, is supplied to the cathode by an air compressor, and hydrogen ions, electrons, and oxygen react at the cathode to generate water.

Generated electrical current extracted from the fuel cell 11 is input to the current and voltage controller 12 to which the capacitor 13, which acts as an energy storing device, and which includes electric dual-layer capacitors, electrolytic capacitors, or the like, is connected.

The fuel cell 11 and the capacitor 13 are connected in parallel with the driving motor 15, which acts as an electrical load, via the output controller 14.

The current and voltage controller 12 includes, for example, a DC—DC chopper, and controls current value of the generated electrical current output from the fuel cell 11 according to a current command output from the control device 17, i.e., a power generation command sent to the fuel cell 11.

The output controller 14 includes, for example, a PWM inverter executing pulse width modulation, and controls a driving operation and a regenerative operation of the driving motor 15 according to a control command output from the control device 17. For example, when the driving motor 15 is used for a driving operation, direct electrical power output from the current and voltage controller 12 and the capacitor 13 is converted into three-phase alternating current and supplied to the driving motor 15 according to a torque command output from the control device 17. On the other hand, when the driving motor 15 is used for a regenerative operation, three-phase alternating current output from the driving motor 15 is converted into direct current, and the capacitor is charged therewith.

The driving motor 15, which is, for example, a permanent magnet type three-phase synchronous motor in which permanent magnets are used for forming a magnetic field, is driven and controlled by three-phase alternating current supplied from output controller 14, and the driving motor 15 also acts as a generator so as to generate regenerative braking force and so that the kinetic energy of the vehicle is recovered as electrical energy when driving force is transmitted to the driving motor 15 from driving wheels during a deceleration operation of the vehicle.

The capacitor 13 is formed, for example, by connecting plural capacitor cells to each other in series, each of which includes an electric dual-layer capacitor, an electrolytic capacitor, or the like, and the protection device 16 is connected to the capacitor 13 via voltage measuring lines which are connected to input and output terminals of the capacitor cells, respectively.

The protection device 16 includes, for example, a cell voltage measuring circuit for measuring inter-terminal voltage (cell voltage) of each of the capacitor cells, a bypass circuit for allowing charging current supplied to each of the capacitor cells to be discharged by bypassing the same, a bypass control unit, and a cell voltage judgment unit. The cell voltage measuring circuit and the bypass circuit are connected to each of the capacitor cells via the voltage measuring lines.

The bypass circuit includes, for example, bypass resistors and switching elements for switching ON and OFF states of the electrical current to be supplied to the bypass resistors.

The bypass control unit controls switching of ON and OFF operations of the switching elements in the bypass circuit, and outputs an ON signal corresponding to a logical high level which places the switching elements in the ON state according to the control command output from the control device 17, or according to a determination result indicating that the cell voltage of the capacitor cell exceeds a predetermined regeneration limitation voltage VR (e.g., VR=2.5 V). As a result, the corresponding capacitor cell discharges via the bypass resistors, and charging current to be supplied to the capacitor cell is made to bypass via the bypass resistors.

The cell voltage judgment unit determines whether voltage of each of the cells exceeds the predetermined regeneration limitation voltage VR (e.g., VR=2.5 V), or a regeneration prohibition voltage VU (e.g., VU=2.7 V) which is higher than the regeneration limitation voltage, and sends the determination result to the bypass control unit and the control device 17.

According to, for example, an operation state of the vehicle, the hydrogen concentration of the reaction gas supplied to the anode of the fuel cell 11, the hydrogen concentration of a discharged gas discharged from the anode of the fuel cell 11, a power generation state of the fuel cell 11, e.g., output voltage of each of the fuel cell units or generated current output from the fuel cell 11, or the like, the control device 17 outputs commands for determining the flow rates of the reaction gases supplied from the air compressor and the hydrogen tank to the fuel cell 11 so as to control the power generation state of the fuel cell 11, and sends a power generation command for the fuel cell 11 to the current and voltage controller 12 so as to control the current value of the generated electrical current output from the fuel cell 11.

Moreover, the control device 17 controls an electrical power conversion operation of the PWM inverter which is provided in the output controller 14, and, when, for example, the driving motor 15 is used for a driving operation, the control device 17 calculates a torque command according to an accelerator opening signal corresponding to the amount of depression of the accelerator pedal operated by the driver. When the torque command is input to the output controller 14 by the control device 17, pulse width modulated signals corresponding to the torque command are input to the PWM inverter, and phase currents for producing required torque are sent to the phases of the driving motor 15, respectively.

In order to achieve such a control operation, the control device 17 is provided with, for example, a measured signal output from the current sensor 21 for measuring the current value of the generated electrical current output from the fuel cell 11, a measured signal output from an accelerator opening sensor 31, a signal output from a brake switch 32 for detecting a brake operation by the driver, and a signal output from an IG switch 33 for indicating the operation of the vehicle.

Furthermore, the control device 17 controls the regenerative operation of the driving motor 15 according to the determination result output from the cell voltage judgment unit of the protection device 16, i.e., the determination result as to whether or not the voltage of each of the cells exceeds a criterion such as the predetermined regeneration limitation voltage VR or the regeneration prohibition voltage VU, and the state of the capacitor 13, e.g., the temperature of the capacitor 13 or a measured total voltage (a measured total voltage SVE) which is obtained by summing up the cell voltages of the plural capacitor cells.

As explained in detail below, when, for example, it is determined that the cell voltage of any one of the capacitor cells exceeds the predetermined regeneration limitation voltage VR, the device 17a estimates a total voltage (i.e., an estimated upper limit of total voltage SVU) at a time at which the cell voltage of the specific cell reaches the regeneration prohibition voltage VU. The control device 17 controls the regenerative operation of the driving motor 15 depending on the difference between the estimated upper limit of total voltage SVU and the measured total voltage SVE over the period until the cell voltage of any one of the capacitor cells reaches the regeneration prohibition voltage VU. For example, the control device 17 sets a lower amount of regeneration as the difference decreases, and sets a higher amount of regeneration as the difference increases.

In order to achieve such a control operation, the control device 17 is connected in parallel with the capacitor 13, and is provided with a measured signal output from the voltage sensor 22 for measuring the total voltage which is obtained by summing up the cell voltages of the capacitor cells, and a measured signal output from the capacitor temperature sensor 23 for measuring the temperature of the capacitor 13.

The regenerative operation control apparatus 10 for a vehicle motor according to the present embodiment is constructed as explained above. Next, the operation of the regenerative operation control apparatus 10, in particular, the control operation for controlling the amount of regeneration (e.g., the current value of the regenerated current output from the output controller 14) will be explained with reference to the appended drawings.

First, for example, in step S01, the cell voltage of each of the capacitor cells of the capacitor 13 is measured.

Next, in step S02, it is determined whether any one of the cell voltages exceeds the predetermined regeneration limitation voltage VR (e.g., VR=2.5 V).

When the result of the determination is "YES", the operation proceeds to step S05 which will be explained below.

In contrast, when the result of the determination is "NO", the operation proceeds to step S03.

In step S03, the flag value of a flag F, which indicates that the estimated upper limit of total voltage SVU is estimated after any one of the cell voltages exceeds the predetermined regeneration limitation voltage VR, is set to be zero, i.e., the flag F is reset. The flag F is provided for preventing duplicated estimation of the estimated upper limit of total voltage SVU, and when the flag value is "1", the estimated upper limit of total voltage SVU is not allowed to be estimated.

In step S04, the amount of regeneration is not restrained, the driving motor 15 is allowed to perform the regenerative operation, and the series of the operations is terminated.

In step S05, as a bypass operation, the switching elements of the bypass circuit which are connected in parallel with the capacitor cells are placed in the ON state so as to make the capacitor cells discharge via the bypass resistors while the charging current to be supplied to the capacitor cells is bypassed to the bypass resistors.

Next, in step S06, it is determined whether any one of the cell voltages exceeds the predetermined regeneration prohibition voltage VU (e.g., VU=2.7 V) which is greater than the regeneration limitation voltage VR.

When the result of the determination is "YES", the operation proceeds to step S11 which will be explained below.

In contrast, when the result of the determination is "NO", the operation proceeds to step S03.

In step S07, it is determined whether the flag value of the flag F is zero.

When the result of the determination is "NO", the operation proceeds to step S10 which will be explained below.

In contrast, when the result of the determination is "YES", the operation proceeds to step S08.

In step S08, the total voltage (i.e., the estimated upper limit of total voltage SVU) at a time at which the cell voltage of the specific cell which exceeds the predetermined regeneration limitation voltage VR reaches the regeneration prohibition voltage VU is estimated.

For example, in this case, a value, which is obtained by adding a total value obtained by multiplying the difference between the regeneration prohibition voltage VU and the regeneration limitation voltage VR by the number N of the capacitor cells ((VU−VR)×N) to the total voltage of the capacitor 13 measured at the time (the measured total voltage SVE), is set to be the estimated upper limit of total voltage SVU.

In step S09, the flag value of the flag F, which indicates that the estimated upper limit of total voltage SVU is estimated after any one of the cell voltages exceeds the predetermined regeneration limitation voltage VR, is set to be "1".

Figure 4:
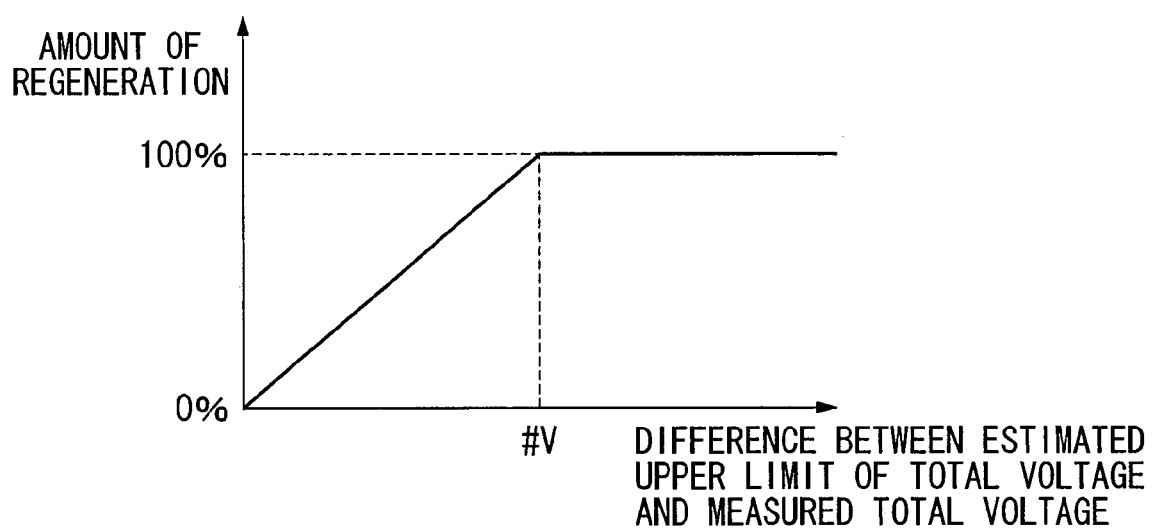
FIG. 4 is a graph showing an example of changes in the amount of regeneration depending on the difference between an estimated total voltage and a measured total voltage.

In step S10, the amount of regeneration is set by retrieving a value from, for example, a predetermined regeneration amount table shown in FIG. 4 depending on the difference between the measured total voltage SVE of the capacitor 13 at the time and the estimated upper limit of total voltage SVU, the driving motor 15 is controlled so as to perform a regenerative operation depending on the amount of regeneration, and then the series of the operations is terminated.

The predetermined regeneration amount table used in step S10 is defined such that restriction of regeneration is cancelled when the difference between the measured total voltage SVE and the estimated total voltage SVU is greater than or equal to a predetermined difference #V, and the degree of restriction is reduced as the difference increases, i.e., the amount of regeneration is increased from 0% to 100% as the difference increases, where the amount of regeneration (e.g., current value of regenerated electrical current) defined to be 100% when no restriction is applied to regeneration.

In step S11, the regenerative operation of the driving motor 15 is not allowed, i.e., the amount of regeneration is set to be 0%, and the series of the operations is terminated.

Figure 3A:
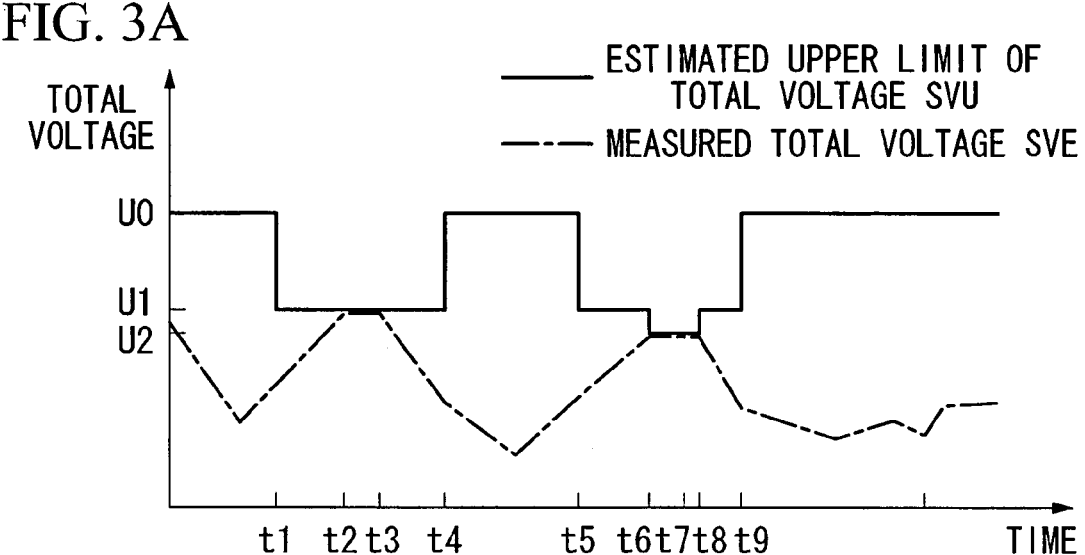
FIG. 3A is a diagram showing an example of time-domain changes in total voltage.
Figure 3B:
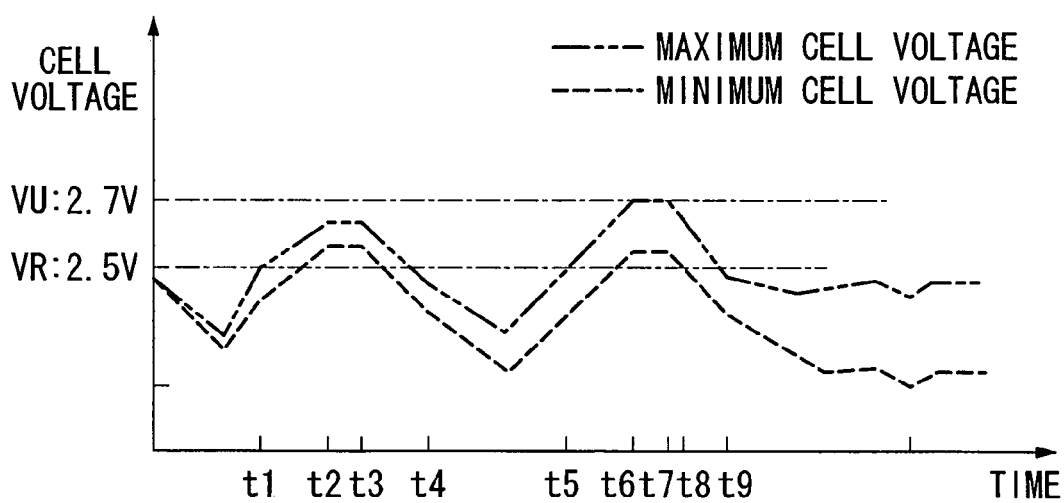
FIG. 3B is a diagram showing an example of time-domain changes in cell voltage.
Figure 3C:
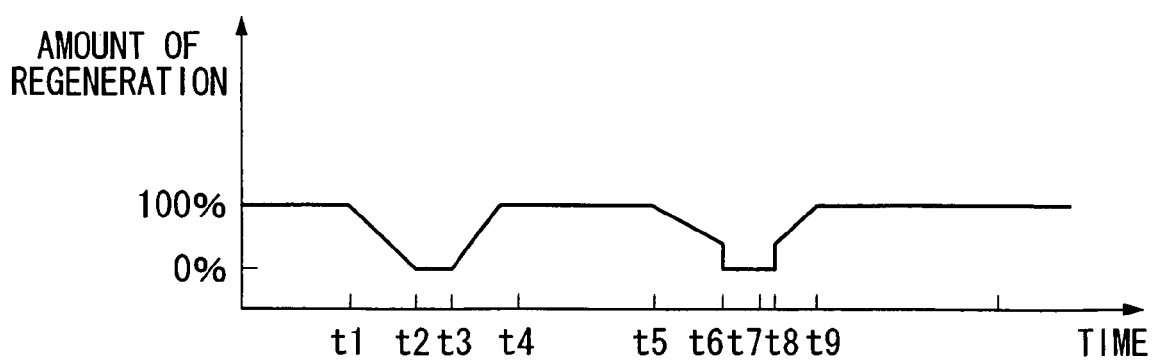
FIG. 3C is a diagram showing an example of time-domain changes in an amount of regeneration.

As shown, for example, in FIGS. 3A to 3C, before time t1, i.e., when the cell voltages are below the regeneration limitation voltage VR (e.g., VR=2.5V), the estimated upper limit of total voltage SVU is set to be a predetermined upper limit U0, and the amount of regeneration is set to be 0%.

When it is determined at time t1 that any one of the cell voltages (e.g., the maximum cell voltage shown in FIG. 3B) exceeds the regeneration limitation voltage VR, the bypass operation is executed, and the estimated upper limit of total voltage SVU is set to be U1 (U1=SVE+(VU−VR)×N) which is obtained by adding a total value obtained by multiplying the difference between the regeneration prohibition voltage VU and the regeneration limitation voltage VR by the number N of the capacitor cells to the measured total voltage SVE.

When any one of the cell voltages exceeds the regeneration limitation voltage VR, and the difference between the measured total voltage SVE and the estimated upper limit of total voltage SVU changes so as to decrease, i.e., during a period from time t1 to time t2, the amount of regeneration is reduced from 100% to 0% according to the predetermined regeneration amount table.

When the difference between the measured total voltage SVE and the estimated upper limit of total voltage SVU is zero, i.e., during a period from time t2 to time t3, the amount of regeneration is set to be 0%, and the regenerative operation of the driving motor 15 is not allowed.

When the difference between the measured total voltage SVE and the estimated upper limit of total voltage SVU changes so as to increase, i.e., during a period from time t3 to time t4, the amount of regeneration is increased from 0% to 100%, and when it is determined at time t4 that the cell voltages are below a value obtained by subtracting a predetermined relief hysteresis from the regeneration limitation voltage VR, the estimated upper limit of total voltage SVU is again set to be U0 (≧U1).

When it is determined at time t5 that any one of the cell voltages exceeds the regeneration limitation voltage VR, the bypass operation is executed, and the estimated upper limit of total voltage SVU is set to be U1 (U1=SVE+(VU−VR)×N), and when the difference between the measured total voltage SVE and the estimated upper limit of total voltage SVU changes so as to decrease, i.e., during a period from time t5 to time t6, the amount of regeneration is reduced from 100% to 0% according to the predetermined regeneration amount table.

When it is determined at time t6 that any one of the cell voltages exceeds the regeneration prohibition voltage VU (e.g., VU=2.7 V), the amount of regeneration is set to be 0% even when, for example, the amount of regeneration obtained from the regeneration amount table is greater than 0% so that the regenerative operation of the driving motor 15 is not allowed. As shown, for example, in FIG. 3A, the estimated upper limit of total voltage SVU is set to be the measured total voltage SVE, i.e., the difference between the measured total voltage SVE and the estimated upper limit of total voltage SVU is set to be zero.

When it is determined at time t8 that any one of the cell voltages exceeds the regeneration limitation voltage VR, and the cell voltages are below a value obtained by subtracting a predetermined relief hysteresis from the regeneration prohibition voltage VU, the estimated upper limit of total voltage SVU is again set to be U1 (U1=SVE+(VU−VR)×N), and a setting in which the difference between the measured total voltage SVE and the estimated upper limit of total voltage SVU is set to be zero is cancelled. Accordingly, a setting in which the amount of regeneration is set to be 0% is cancelled, and the regenerative operation of the driving motor 15 is performed according to the amount of regeneration obtained from the regeneration amount table.

When the difference between the measured total voltage SVE and the estimated upper limit of total voltage SVU changes so as to increase, i.e., during a period from time t8 to time t9, the amount of regeneration is increased to 100% according to the predetermined regeneration amount table, and when it is determined at time t9 that the cell voltages are below a value obtained by subtracting a predetermined relief hysteresis from the regeneration limitation voltage VR, the estimated upper limit of total voltage SVU is again set to be U0 (≧U1).

As explained above, according to the regenerative operation control apparatus 10 for a vehicle motor, the amount of regeneration can be smoothly changed by controlling the amount of regeneration of the driving motor 15 depending on the difference between the estimated upper limit of total voltage SVU, which is determined when any one of the cell voltages exceeds the regeneration limitation voltage VR, and the measured total voltage SVE, and thus excessive and rapid changes in driving states can be prevented.

Moreover, overcharging of the capacitor 13 can be prevented by not allowing the driving motor 15 to perform a regenerative operation when any one of the cell voltages exceeds the predetermined regeneration prohibition voltage VU which is greater than the regeneration limitation voltage VR even when the amount of regeneration is controlled depending on the difference between the estimated upper limit of total voltage SVU and the measured total voltage SVE.

In addition, because the regeneration limitation voltage VR is also used as a criterion for determining as to whether the bypass operation should be executed, the structure of the regenerative operation control apparatus 10 for a vehicle motor, which is configured so as to execute the bypass operation and the regenerative control operation, can be simplified.

In the above-described embodiment, the amount of regeneration is set according to the predetermined regeneration amount table depending on the difference between the measured total voltage SVE and the estimated upper limit of total voltage SVU. In the case in which, for example, the regenerated current is controlled so as to control the amount of regeneration, a current measuring device (not shown) is provided for measuring electrical current at the capacitor 13, and the control device 17, first, estimates an open-terminal voltage, i.e., voltage with no current, of the capacitor 13 based on the measured total voltage SVE measured by the voltage sensor 22, an internal resistance of the capacitor 13, and measured current. The control device 17, then, calculates a regenerative electrical power required for making the estimated open-terminal voltage to reach the estimated upper limit of total voltage SVU, and executes a feedback control operation with respect to electrical current (i.e., regenerated current) depending on the calculated regenerative electrical power.

In the above-described embodiment, the regenerative operation of the driving motor 15 is not allowed in step S11; however, the invention is not limited to this, and the amount of regeneration of the driving motor 15 may be, for example, reduced to substantially a level of zero.

In the above-described embodiment, the amount of regeneration is controlled depending on the difference between the estimated upper limit of total voltage SVU and the measured total voltage SVE after any one of the cell voltages exceeds the predetermined regeneration limitation voltage VR; however, in addition, a table of the estimated upper limit of total voltage SVU in which the estimated upper limit of total voltage SVU varies depending on the temperature of the capacitor 13 may be provided, and the amount of regeneration may be controlled depending on the difference between the measured total voltage SVE and a smaller value which is obtained by comparing the estimated upper limit of total voltage SVU estimated depending on the cell voltage with the estimated upper limit of total voltage SVU retrieved depending on the temperature of the capacitor 13.

In the above-described embodiment, the energy storage device which sends and receives electrical energy to and from the driving motor 15 is the capacitor 13; however, the invention is not limited to this, and the energy storage device may be, for example, a battery assembly formed by connecting plural cells 13a, 13b and 13c to each other in series, each of which includes a secondary battery such as a lithium ion battery.

Advantageous Effects Obtainable by the Invention

As explained above, according to the control apparatus for controlling a regenerative operation of a vehicle motor of the present invention, the amount of regeneration can be smoothly reduced, and thus excessive and rapid changes in driving states can be prevented.

Moreover, according to another control apparatus for controlling a regenerative operation of a vehicle motor of the present invention, excessive changes in driving states can be prevented while reliably preventing overcharging of the cells.

The invention claimed is:

1. A control apparatus for controlling a regenerative operation of a vehicle motor comprising:
   a vehicle motor as a drive source of a vehicle;
   an energy storage device, including plural cells that are connected to each other in series, for storing regenerative energy generated by a regenerative operation of the vehicle motor;
   a total voltage measuring device for measuring a total voltage that is a sum of inter-terminal voltages of the plural cells;
   a cell voltage judgment device for determining whether the inter-terminal voltage of any one of the plural cells exceeds a predetermined regeneration limitation voltage;
   a total voltage estimating device for determining, when it is determined by the cell voltage judgment device that the inter-terminal voltage of any one of the cells exceeds the predetermined regeneration limitation voltage, an estimated total voltage which is defined as a total voltage at a time when the inter-terminal voltage of the one of the cells reaches a regeneration prohibition voltage that is higher than the predetermined regenerative operation limiting voltage; and
   a control device for setting an amount of regeneration depending on a difference between the estimated total voltage determined by the total voltage estimating device and the total voltage measured by the total voltage measuring device.

2. A control apparatus for controlling regenerative operation of vehicle motor according to claim 1, comprising a regeneration prohibiting device for not allowing the vehicle motor to perform a regenerative operation when the inter-terminal voltage of any one of the cells reaches the regeneration prohibition voltage before the total voltage measured by the total voltage measuring device reaches the estimated total voltage determined by the total voltage estimating device.

3. A control apparatus for controlling regenerative operation of vehicle motor according to claim 1, wherein the control device sets a greater amount of regeneration when the difference between the estimated total voltage determined by the total voltage estimating device and the total voltage measured by the total voltage measunng device is greater.

* * * * *